United States Patent
Jensen et al.

(10) Patent No.: US 6,347,326 B1
(45) Date of Patent: Feb. 12, 2002

(54) N BIT BY M BIT MULTIPLICATION OF TWOS COMPLEMENT NUMBERS USING N/2+1 X M/2+1 BIT MULTIPLIERS

(75) Inventors: Rune Hartung Jensen, Sunnyvale; Hans Albert Spanjaart, Cupertino; Hans Adrianus Bouwmeester, Sunnyvale, all of CA (US); Kenneth David Currie, Beuningen (NL)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/260,343

(22) Filed: Mar. 2, 1999

(51) Int. Cl.[7] .................................................. G06F 7/52

(52) U.S. Cl. ...................................... 708/625; 708/628

(58) Field of Search ............................. 708/625, 628, 708/630

(56) References Cited

U.S. PATENT DOCUMENTS

| | | | | |
|---|---|---|---|---|
| 4,722,068 A | * | 1/1988 | Kuroda et al. | 708/625 |
| 4,761,756 A | | 8/1988 | Lee et al. | 364/757 |
| 4,860,240 A | * | 8/1989 | Hartly et al. | 708/625 |
| 5,153,850 A | | 10/1992 | Williams | 364/757 |
| 5,181,184 A | * | 1/1993 | Shim et al. | 708/625 |
| 5,467,296 A | | 11/1995 | Suzuki | 364/754 |
| 6,014,684 A | * | 1/2000 | Hoffman | 708/625 |

* cited by examiner

Primary Examiner—David H. Malzahn

(57) ABSTRACT

The operands of an N×M bit multiplication are partitioned into N/j+1 and M/k+1 bit signed submultiples. The most significant submultiple is assigned the sign of the operand, while each of the less significant submultiples is assigned a positive sign. The product of each submultiple pair is sign extended to the width of the product (N+M), and the accumulation of these sign extended submultiple products provides the product of the original twos complement operands, in twos complement form.

9 Claims, 4 Drawing Sheets

FIG. 1
(PRIOR ART)

|  | BINARY | DECIMAL MAGNITUDE | 2's COMPLEMENT |
|---|---|---|---|
| H2 ⌢ 10 10 ⌢ L2 | | 10 | −6 |
| H1 ⌢ 01 11 ⌢ L1  x | | x7 | x7 |
| L1*L2 | 01 10 | 6 | 6 |
| L1*H2 | 01 10 00 | 24 | 24 |
| H1*L2 | 00 10 00 | 8 | 8 |
| H1*H2 | 00 10 00 00 | 32 | 32 |
| L1*L2 + L1*H2 + H1*L2 + H1*H2 | 01 00 01 10 | 70 (CORRECT) | 70 (INCORRECT) |

FIG. 2
(PRIOR ART)

| 2's COMPLEMENT | | 2's − SM CONVERT | BINARY | DECIMAL MAGNITUDE |
|---|---|---|---|---|
| −6 | 10 10 | S2 → − | 01 10 | 6 |
| x 7 | 01 11 | + ← S1 | x 01 11 | x 7 |
| | | S1 * S2 | 01 10 | 6 |
| | | | 00 11 00 | 12 |
| | | | 00 10 00 | 8 |
| | | | 00 01 00 00 | 16 |
| | | − | 01 00 01 10 | 42 |
| −42  11 01 01 10 | | ← SM − 2's CONVERT | | |

US 6,347,326 B1

N BIT BY M BIT MULTIPLICATION OF TWOS COMPLEMENT NUMBERS USING N/2+1 X M/2+1 BIT MULTIPLIERS

BACKGROUND OF THE INVENTION

1. Field of the Invention

This invention relates to the field of computing devices, and in particular to the field of binary multiplication.

2. Description of Related Art

The representation of negative numbers in a binary number system can take a variety of forms. Two common representations are sign-magnitude (SM), and twos complement (2's). In the sign-magnitude representation, a sign-bit is used to represent the algebraic sign of the number, and an independent set of bits are used to represent the magnitude of the number. In the twos complement representation, negative numbers are represented as the result of a subtraction of the magnitude of the number from zero. That is, in a four bit system, for example, a negative 2 is represented as the result of 0000 minus 0010, which is 1110 (the borrow, or carry, produced by the subtraction is ignored). The twos complement representation has the advantageous characteristic that additions and subtractions of twos complement numbers can be effected without regard for whether the numbers being added or subtracted are positive or negative. That is, the addition of 5 (0101) to a negative 2 (1110) is 3 (0011) (the borrow, or carry, produced by the addition is ignored). The sign-magnitude representation requires a specific consideration of the sign bit of each number to determine whether, for example, an "addition" is actually a subtraction of magnitudes depending upon the sign of each number being added. That is, the addition of 5 (+0101) to a negative 2 (−0010) is effected by subtracting 2 (0010) from 5 (0101) to produce a magnitude of 3 (0011). The sign of the result also requires a comparison of the magnitudes of each number as well.

The sign-magnitude representation, on the other hand, is well suited for multiplication, while the twos complement representation cannot be used directly to perform multiplication. FIG. 1 illustrates the problem. Shown in FIG. 1 is the binary multiplication of the binary numbers 1010 and 0111 to produce the binary product 01000110. As is common in the art, the multiplication of two numbers is often performed as a sequence of sub-multiple multiplications, so as to allow the use of a smaller, less costly, multiplier. In general, an N×M bit multiplication is effected by a sequence of N/j×M/k bit multiplications, where N, M, j, k, N/j, and M/k are integers. That is, for example, the multiplication of two 32 bit numbers can be preformed as a sequence of repeated 16 bit multiplications (N/2×M/2), or a sequence of 16 bit by 8 bit multiplications (N/2×M/4), and so on. The results of each sub-multiplication are accumulated, appropriately shifted dependent upon the place of the submultiples, to form the product. FIG. 1 illustrates the multiplication of the two four-bit numbers (4×4 bit multiplication) as a sequence of two-bit submultiple multiplications (4/2×4/2 bit multiplications). The submultiples of the two number N1, N2 being multiplied are identified as H1, L1, and H2, L2 respectively. The H and L notations are used to signify high-order and low-order submultiples, respectively. In binary form, the value of the binary submultiple L1 is 11, and the value of the binary submultiple L2 is 10. The product of L1 and L2 is identified as L1*L2 in FIG. 1, and has the value 0110. In decimal magnitude form, the value of L1 (11) is 3, the value of L2 (10) is 2, and the product of L1 and L2 (0110) is 6. In like manner, the product of submultiples L1 (11) and H2 (10) is identified as L1*H2 in FIG. 1, and has the value of (0110) shifted left two places (011000), corresponding to the place of H2 being two places to the left. The product of submultiples H1 (01) and L2 (10) is identified as H1*L2 in FIG. 1, and has the value of (0010) shifted left two places (001000), corresponding to the place of H1 being two places to the left. The product of submultiples H1 (01) and H2 (10) is identified as H1*H2 in FIG. 1, and has the value of (0010) shifted left four places (00100000), corresponding to the place of H1 and H2 each being two places to the left.

In decimal magnitude form, the value of subproducts L1*L2 (0110), L1*H2 (011000), H1*L2 (001000), and H1*H2 (00100000) are 6, 24, 8, and 32, respectively. The sum of these binary subproducts is 01000110, which in decimal form is 70, the product of the numbers N1 (7) and N2 (10). That is, if the binary numbers 0111 and 1010 represent decimal magnitudes 7 and 10, the sum of the products of their submultiples accurately represents their product as a decimal magnitude, 70.

In twos complement form, however, the binary numbers 0111 and 1010 represent decimal values 7 and −6, respectively. The binary product of these two binary numbers, 01000110, does not, however, accurately represent their product, −42.

Conventionally, the multiplication of twos complement numbers is effected by first converting the twos complement numbers into sign-magnitude form, and multiplying the magnitudes. If the signs of the multiplicands differ, the product of the magnitudes is converted to a negative number in twos complement form. FIG. 2 illustrates this process, using the same multiplicands as in FIG. 1. The twos complement representation (1010) of −6 is converted to a negative sign S1, and a magnitude of 6 (0110 ). The twos complement representation (0111) of 7 is converted to a positive sign S2, and a magnitude of 7 (0111). The binary product of 0111 (7) and 0110 (6) is 01000110 (42). Because the sign S1, S2 of the multiplicands differ, the product 01000110 (42) is converted to the negative of 01000110 in twos complement form 11010110, thereby producing the proper result, −42 in twos complement form.

Note that the twos complement conversion is applied to the original four-bit wide number, and thereafter the multiplication is effected on the narrower two-bit wide submultiples. As noted above, narrower operations consume less area of circuitry, and therefore are less costly, than wider operations (the terms wide and narrow are used herein to describe the number of bits comprising a number, independent of the magnitude of the number, a wide number having more bits than a narrow number). The conversions of a wide number between twos complement form and sign-magnitude form is time consuming, and the circuitry required to effect the conversions is area consuming. Therefore, a need exists for a device or process that allows for the multiplication of twos complement numbers that does not require a wide twos complement conversion.

BRIEF SUMMARY OF THE INVENTION

It is an object of this invention to provide a process and device that allows for the multiplication of twos complement numbers without a wide conversion to and from twos complement form. This object and others are achieved by partitioning the operands of an N×M bit multiplication into N/j+1 bit and M/k+1 bit submultiples, respectively. The most significant submultiple is assigned the sign of the operand, while each of the less significant submultiple is assigned a positive sign. The product of each submultiple pair is sign extended to the width of the product (N+M), and the accumulation of these sign extended submultiple products provides the product of the original twos complement operands, in twos complement form.

BRIEF DESCRIPTION OF THE DRAWINGS

The invention is explained in further detail, and by way of example, with reference to the accompanying drawings wherein:

FIG. 1 illustrates a prior art binary N×M bit multiplication using a sequence of N/2×M/2 bit multiplications.

FIG. 2 illustrates a prior art twos complement N×M bit multiplication using a sequence of N/2×M/2 multiplications.

DETAILED DESCRIPTION OF THE INVENTION

Figure 3:
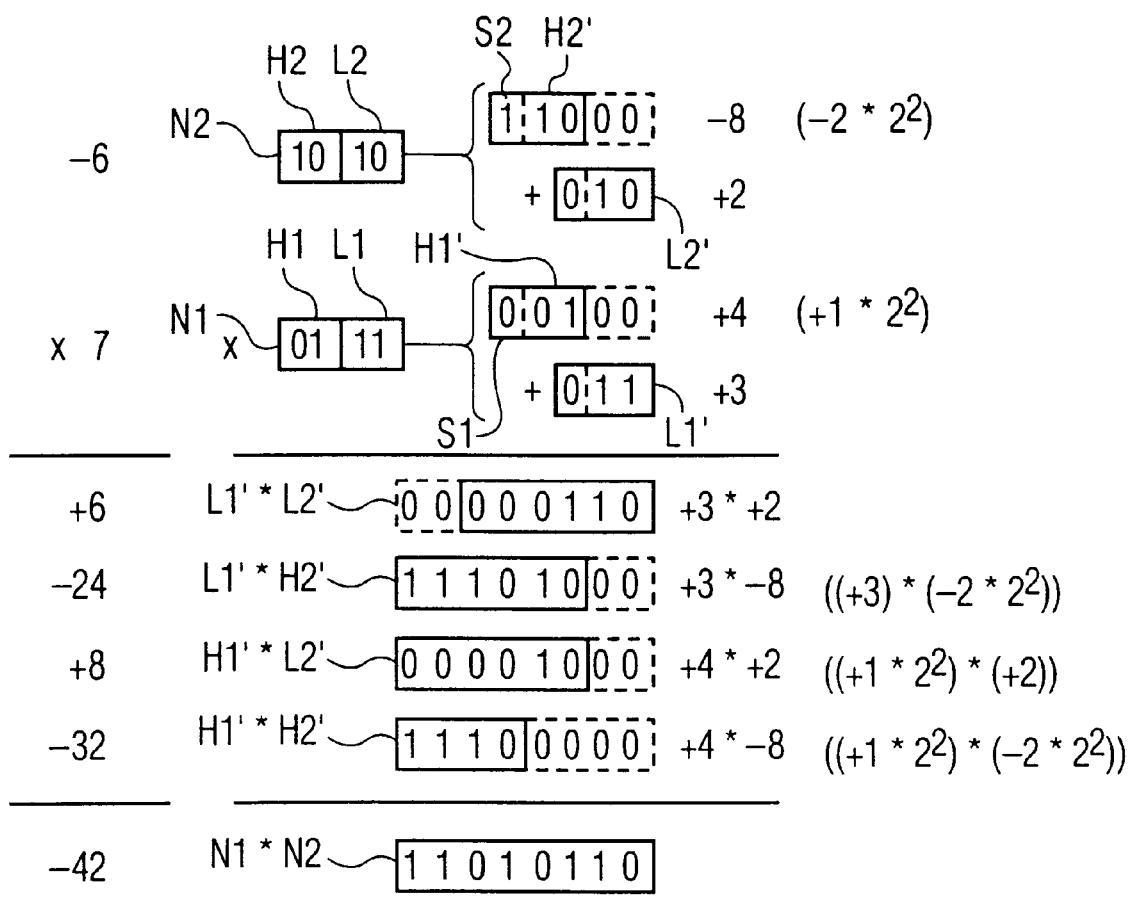
FIG. 3 illustrates an example twos complement N×M bit multiplication using a sequence of N/2+1×M/2+1 bit multiplications in accordance with this invention.

For ease of reference, the original N and M bit numbers that are to be multiplied are termed herein as the operands of the N by M multiplication operation.

This invention is premised on the observation, illustrated in Table 1, that the twos complement form of a negative operand can be represented as the sum of a negative number plus a positive offset. That is, if a negative operand is partitioned into submultiples, the most significant submultiple represents a negative number that is less than or equal to the operand, and the lesser significant submultiples represent positive offsets from the most significant submultiple. In like manner, positive numbers are represented as the sum of a positive number plus a positive offset. That is, regardless of the sign of the operand, each lesser significant submultiple of the operand can be interpreted as a positive number. In accordance with this invention, the most significant submultiples of each operand are multiplied as positive or negative numbers, depending upon the sign of the operand, and all of the other submultiples are multiplied as positive numbers, corresponding to their representation as a positive offset.

To distinguish those submultiples that are positive from those that are negative, an additional bit is associated with each submultiple. The value of this bit for the most significant submultiples of each operand corresponds to the sign of the operand, and is positive for all other submultiples of the operand. This sign bit can be used as the sign bit for a binary sign-magnitude multiplication, after the appropriate twos complement conversion of any negative submultiple, as discussed with regard to FIG. 2. As compared to the prior art of FIG. 2, however, the width of the twos complement conversion in accordance with this invention is the width of the submultiple, not the width of the entire operand. Alternatively, the sign bit can be used as a sign extension of the submultiple, and the sign extended submultiples are multiplied by a twos complement multiplier of sufficient width to include the sign extended submultiple. As would be evident to one of ordinary skill in the art, both methods are equivalent, in that a twos complement multiplier likely contains a twos complement converter that converts the sign extended submultiple into a sign-magnitude representation. For ease of reference, the invention is presented hereinafter using a twos complement multiplier.

TABLE 1

| Twos Complement Representation | | |
|---|---|---|
| Binary | Sub Multiples | Decimal |
| 0000 | $(0 * 2^2) + (0 * 2^0)$ | 0 |
| 0001 | $(0 * 2^2) + (1 * 2^0)$ | 1 |
| 0010 | $(0 * 2^2) + (2 * 2^0)$ | 2 |
| 0011 | $(0 * 2^2) + (3 * 2^0)$ | 3 |
| 0100 | $(1 * 2^2) + (0 * 2^0)$ | 4 |
| 0101 | $(1 * 2^2) + (1 * 2^0)$ | 5 |
| 0110 | $(1 * 2^2) + (2 * 2^0)$ | 6 |
| 0111 | $(1 * 2^2) + (3 * 2^0)$ | 7 |
| 1111 | $(-1 * 2^2) + (3 * 2^0)$ | −1 |
| 1110 | $(-1 * 2^2) + (2 * 2^0)$ | −2 |
| 1101 | $(-1 * 2^2) + (1 * 2^0)$ | −3 |
| 1100 | $(-1 * 2^2) + (0 * 2^0)$ | −4 |
| 1011 | $(-2 * 2^2) + (3 * 2^0)$ | −5 |
| 1010 | $(-2 * 2^2) + (2 * 2^0)$ | −6 |
| 1001 | $(-2 * 2^2) + (1 * 2^0)$ | −7 |
| 1000 | $(-2 * 2^2) + (0 * 2^0)$ | −8 |

The product of each submultiple pair that includes a most significant submultiple of the operand may be positive or negative. To properly effect the accumulation of these submultiple products that may be positive or negative, each submultiple product (hereinafter termed a subproduct) is sign-extended to the full width of the product of the operands, and then accumulated. Sign extension is merely the replication of the sign bit of a narrow number to fill the more significant bits of a wider number. In a preferred embodiment, the sign extension is effected when the subproduct is shifted in accordance to the place value of each submultiple, as will be discussed further below.

FIG. 3 illustrates an example twos complement N×M bit multiplication using a sequence of N/2+1×M/2+1 bit multiplications in accordance with this invention. The two operands, N1 and N2 are illustrated as four bit wide numbers, having most significant submultiples H1 and H2 respectively, and less significant submultiples L1 and L2 respectively. In accordance with this invention, each two bit submultiple L1, H1, L2, H2 is transformed into a three bit representation L1', H1', L2', H2' respectively. The additional bit, the sign bit, indicates a positive sign (0) for the less significant submultiples L1' and L2', and the sign of the operands N1 and N2 for the most significant submultiples H1' and H2'. The most significant submultiples H1' and H2' are illustrated as having two implied lower order zero bits, thereby maintaining the place value of the submultiples H1 and H2 respectively.

The products of the submultiple pairs are indicated in FIG. 3 as L1*L2, L1*H2, H1*L2, and H1*H2 As discussed above, alternative embodiments can be employed to compute these products, as would be evident to one of ordinary skill in the art. In a preferred embodiment, a three-bit by three-bit twos complement multiplier is used to provide the product of these "two bit plus sign" submultiples. The products of the submultiples pairs are appropriately shifted and sign extended to reflect the sign and place values. The product of the operands N1 and N2 is the binary sum of the products of the submultiples, as illustrated in FIG. 3. In decimal form, the shifted and sign extended products of the submultiples L1*L2, L1*H2, H1*L2, and H1*H2 are 6 (3*2), −24 (3*(−2*2²)), 8(2*2²), and −32(−2*2⁴), and their sum is −42, the product of the operands N1 (7) and N2 (−6).

Figure 4:
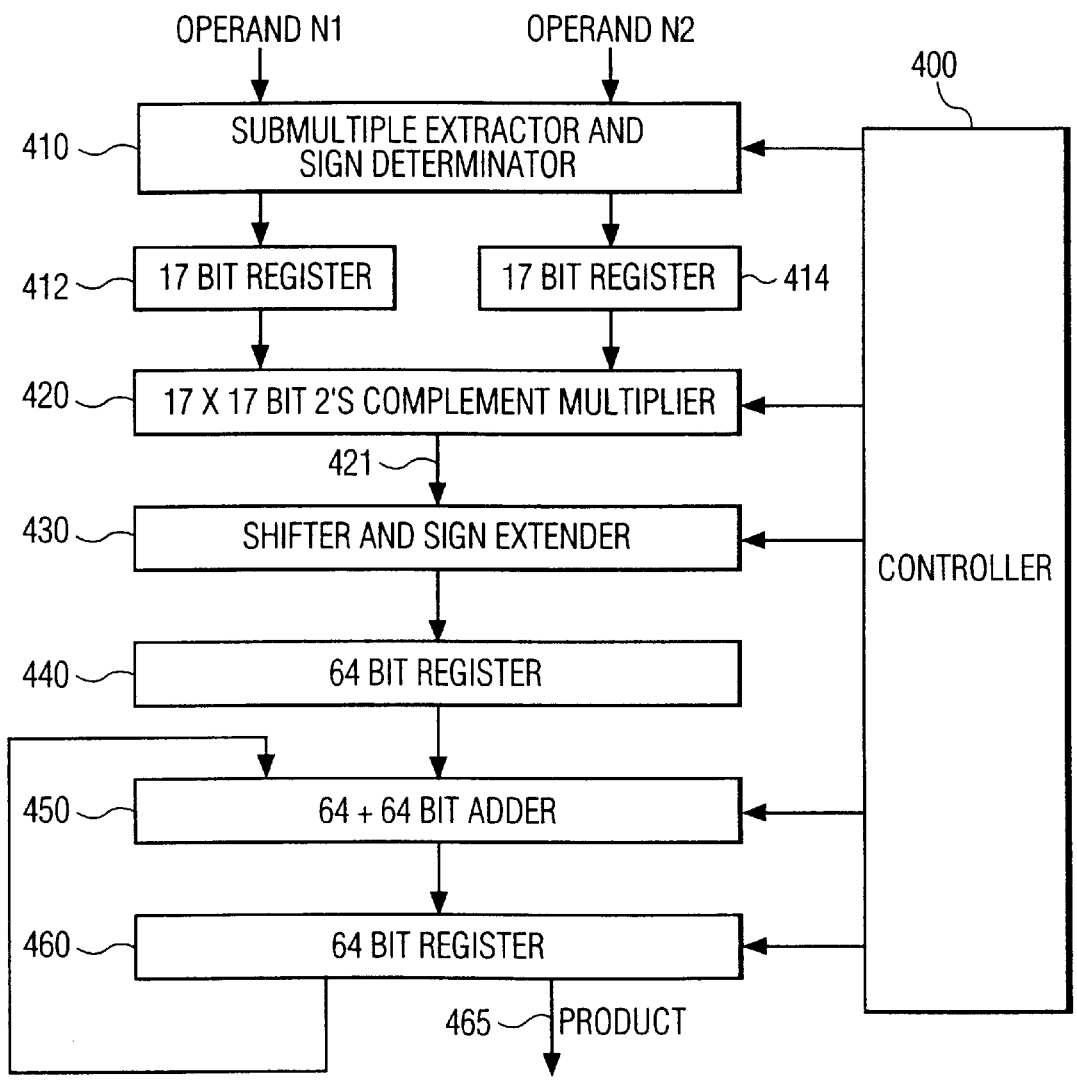
FIG. 4 illustrates an example block diagram of a twos complement N×M bit multiplication using N/2+1×M/2+1 bit multipliers in accordance with this invention.

FIG. 4 illustrates an example block diagram of a twos complement 32×32 bit multiplication using a 17×17 bit multiplier in accordance with this invention. Under the control of the controller 400, the operands N1 and N2 are partitioned into 16 bit submultiples (N/2) plus a sign bit, for a total width of 17 bits, in the submultiple extractor and sign determinator 410. Each set of submultiple pairs ((L1, L2 ), (L1, H2), (H1, L2 ), and (H1, H2)) and their associated sign bits are placed in the 17 bit registers 412, 414. In a preferred embodiment, the sign bit is placed in the most significant bit position of each 17 bit register 412, 414 and the submultiples are placed in the lower 16 bit positions. As noted above, the sign bit is positive for each of the lower submultiples L1, L2, and is equal to the sign of the operands N1 and N2 for the high order submultiples H1 and H2 respectively.

The contents of the two 17 bit registers 412, 414 are multiplied via the 17×17 bit twos complement multiplier 420. The twos complement subproduct 421 is provided to the shifter and sign extender 430. Under the control of the controller 400, the subproduct is shifted to account for the place value of the submultiples forming the subproduct. In this example, the place value of the high order submultiples is 16 bits, and the place value of the lower order submultiples is 0 bits. The subproduct of the lower order submultiples is shifted by 0 bits; the subproducts of one lower order submultiple and one high order submultiple are shifted by 16 bits; the subproduct of the high order submultiples is shifted by 32 bits. The shifted subproduct is also sign extended by the shifter and sign extender 430. The shifted subproducts of one lower order submultiple and one high order submultiple will consume, at most, 50 bits (34 bit product of two 17 bit numbers, plus 16 bits of shift). The product of the two 32 bit operands, however, may consume 64 bits. To maintain the sign of the subproduct properly, the excess high order bits (between the size of the shifted subproduct and the size of the product) must be filled with the sign of the subproduct. In a preferred embodiment, this is effected by replicating the most significant bit of the subproduct into the excess high order bits.

The shifted and sign extended subproduct is stored in the 64 bit register 440. This shifted and sign extended subproduct is added to the contents of the 64 bit register 460 by the 64+64 bit adder 450 and the sum is placed in the 64 bit register 460. Under the control of the controller 400, the contents of the 64 bit register 460 are cleared at the start of each 32×32 bit multiplication, such that the 64 bit register 460 will contain the sum of the subproducts as the multiplication progresses. After processing the four pair of submultiples ((L1, L2), (L1, H2), (H1, L2), and (H1, H2)), the 64 bit register 460 contains the 64 bit product of the operands N1 and N2, in twos complement form.

Note that, in accordance with this invention, a 32 bit wide twos complement conversion is not required for each operand N1, N2, nor for the product N1*N2 that is contained in the 64 bit register 460.

Figure 5:
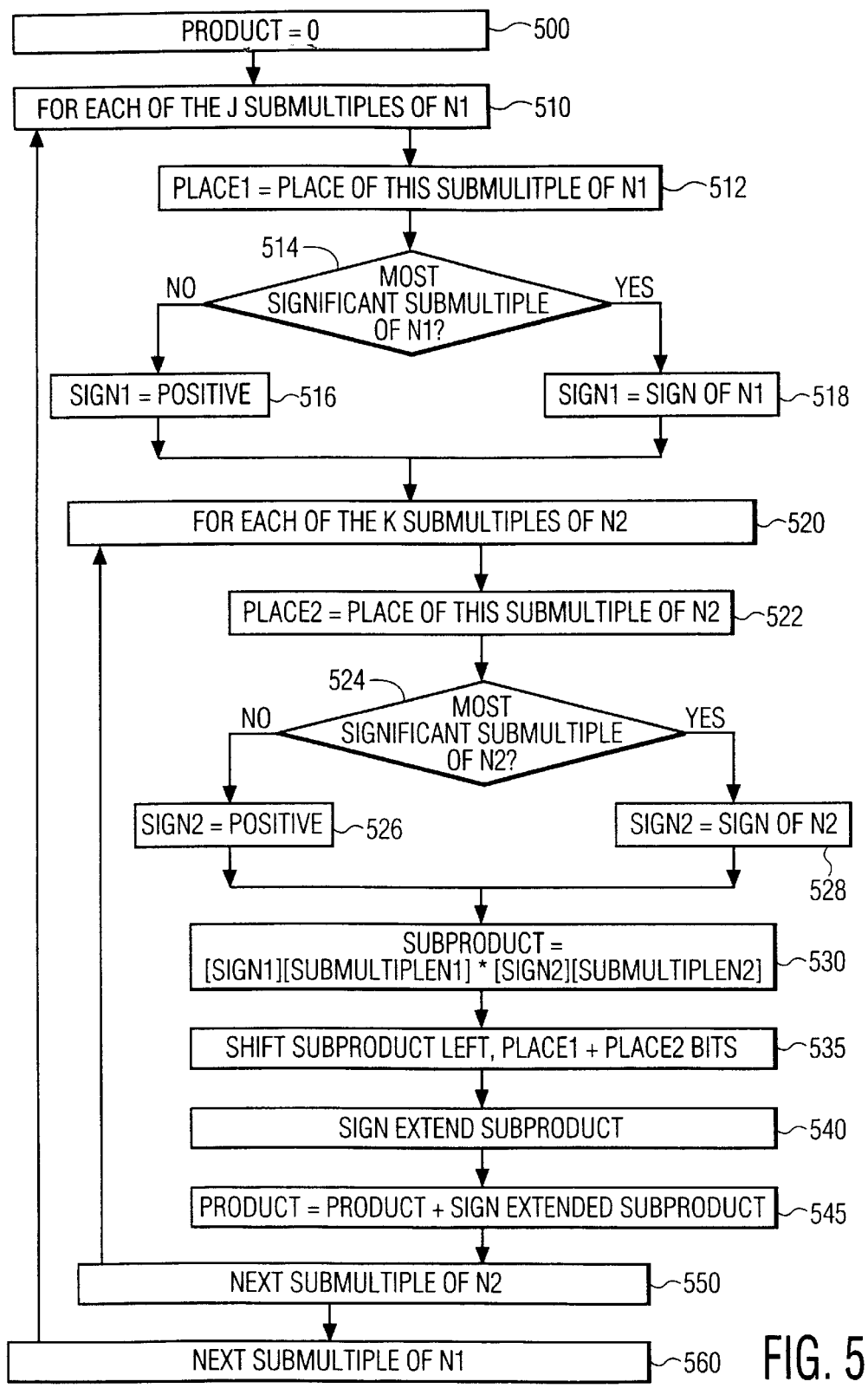
FIG. 5 illustrates an example flow diagram of a twos complement N×M bit multiplication using a sequence of N/j+1×M/k+1 bit multiplications in accordance with this invention.

FIG. 5 illustrates an example flow diagram of a twos complement N×M bit multiplication using a sequence of N/j+1×M/k+1 bit multiplications in accordance with this invention. The variable used to accumulate the product is initialized to zero, at 500 . The loop 510–560 processes each of the j submultiples of the operand N1, and the inner loop 520–550 processes each of the k submultiples of the operand N2. The place value of each submultiple is determined at 512 and 522. The place value being the power of 2 that is associated with the least significant bit of each submultiple. A sign bit is determined for each submultiple of N1 by the blocks 514–518, and for each submultiple of N2 by the corresponding blocks 524–528. If, at 514 (524), the submultiple is the most significant submultiple of N1 (N2), the sign of the submultiple is set to the sign of the operand N1 (N2), at 518 (528); otherwise, the sign of the submultiple is set positive, at 516 (526). Each of the j submultiples of N1 are multiplied by each of the k submultiples of N2, as signed multiplicands to form a signed subproduct, at 530.

Each signed subproduct is shifted to correspond to the place values of each of the submultiples, at 535, and sign extended to the full width of the product variable, at 540. The shifted and sign extended subproduct is added to the product variable, at 545. After processing each of the submultiples of N1 and each of the submultiples of N2, the product variable contains the signed product of N1*N2. Again, it is significant to note that the signed product of two signed operands has been demonstrated to be computed without a twos complement conversion of the operands or the resulting product.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the invention is presented herein using a binary, base two, system, although the principles presented herein are applicable to alternative base systems. The example embodiments presented herein are for illustrative purposes, and alternative embodiments can be effected to optimize the invention for a particular application. For example, a multiplier used for scaling may use a signed operand as the number to be scaled and an unsigned operand as the magnitude of the scaling factor. In such an embodiment, only the most significant submultiple of the signed operand need be processed by the sign determinator; all other submultiples will be positive. In such an embodiment, an N/j+1 by M/k bit multiplier would be sufficient, in lieu of the typical N/j+1 by M/k+1 bit multiplier. Also for example, the invention is presented herein using equal sized submultiples of each operand, although the principles presented herein do not require the use of equally sized submultiples. For example, if a system includes an 9 bit signed multiplier and a 17 bit signed multiplier, the multiplication of a 24 bit signed operand can be effected using an 8 bit submultiple and a 16 bit submultiple.

The invention may be embodied in hardware, software, or a combination of both. For example, the multiplier 420 may be a hardware device, while the controller 400 and submultiple extractor and sign determinator 410 may be a software program. Such architectural and structural alternatives would be common to one of ordinary skill in the art, and within the scope of the following claims.

We claim:

1. A multiplier for multiplying a first operand by a second operand, comprising:

a sign determinator that determines a first submultiple sign associated with a first submultiple of the first operand, and produces a first signed submultiple of the first operand, a submultiple multiplier that multiplies the first signed submultiple of the first operand by a second submultiple of the second operand to produce a signed subproduct, and an accumulator that accumulates a signed sum of the signed subproduct, wherein the first and second operands are single precision data.

2. The multiplier of claim 1, wherein:

the first operand has a first operand sign, and the sign determinator determines the first submultiple sign to correspond to the first operand sign when the first submultiple is a most significant submultiple of the first operand, and positive otherwise.

3. The multiplier of claim 1, wherein:

the sign determinator also determines a second submultiple sign associated with the second submultiple of the second operand, and modifies the second submultiple of the second operand to include the second submultiple sign.

4. The multiplier of claim 1, further comprising a shifter that shifts the signed subproduct in dependence upon a first place value of the first signed submultiple and a second place value of the second submultiple.

5. A multiplier for multiplying a first operand having N bits by a second operand having M bits, the first and second operands being single precision data, comprising:

a submultiple extractor that extracts:
  a first submultiple of a plurality of j submultiples of the first operand, and
  a second submultiple of a plurality of k submultiples of the second operand;

a sign determinator that
  determines:
    a first sign of the first submultiple, and
    a second sign of the second submultiple, and produces:
    a first signed submultiple based on the first sign and the first submultiple, and,
    a second signed submultiple based on the second sign and the second submultiple;

an N/j+1 by M/k+1 bit submultiple multiplier that multiplies the first signed submultiple by the second signed submultiple to produce a signed subproduct;

a shifter and sign extender that shifts and sign extends the signed subproduct to produce a shifted signed subproduct; and an accumulator that accumulates the shifted signed subproduct so as to produce a signed product.

6. The multiplier of claim 5, further including:

a controller, operably coupled to the submultiple extractor, the sign determinator, the N/j+1 by M/k+1 bit submultiple multiplier, the shifter and sign extender, and the accumulator, that controls the determination and multiplication of each of the plurality of j submultiples and each of the plurality of k submultiples.

7. A method of multiplying a first signed operand and a second signed operand, the first and second signed operands being single precision data, comprising the steps of:

partitioning the first signed operand into a first most significant submultiple and one or more first less significant submultiples, associating a first operand sign of the first signed operand to the first most significant submultiple, associating a positive sign to the one or more first less significant submultiples, multiplying the first most significant submultiple and associated first operand sign by the second signed operand to produce a first subproduct, multiplying the one or more first less significant submultiples by the second signed operand to produce one or more second subproducts, accumulating the first subproduct and one or more subproducts to produce a signed product of the first signed operand and the second signed operand.

8. The method of claim 7, further including the steps of:

partitioning the second signed operand into a second most significant submultiple and one or more second less significant submultiples, associating a second operand sign of the second signed operand to the second most significant submultiple, and associating a positive sign to the one or more second less significant submultiples, and wherein the steps of multiplying the first most significant submultiple and associated first operand sign by the second signed operand and multiplying the one or more first less significant submultiples by the second signed operand to produce one or more second subproducts, is effected by multiplying the first most significant submultiple and the one or more first less significant submultiples by the second most significant submultiple and each of the one or more second less significant submultiples.

9. The method of claim 7, wherein the step of accumulating the first subproduct and one or more subproducts includes the steps of:

shifting the first subproduct in dependence upon a place value of the most significant submultiple to produce a first shifted subproduct, sign extending the first shifted subproduct to produce a shifted sign extended first subproduct, and adding the first shifted sign extended subproduct to the one or more less significant submultiples.

\* \* \* \* \*